(12) United States Patent
Sakuraba et al.

(10) Patent No.: US 8,107,617 B2
(45) Date of Patent: Jan. 31, 2012

(54) AUDIO PROCESSOR

(75) Inventors: Yohei Sakuraba, Kanagawa (JP); Yasuhiko Kato, Tokyo (JP); Nobuyuki Kihara, Tokyo (JP)

(73) Assignee: Sony Corporation, Tokyo (JP)

( * ) Notice: Subject to any disclaimer, the term of this patent is extended or adjusted under 35 U.S.C. 154(b) by 1370 days.

(21) Appl. No.: 11/681,025

(22) Filed: Mar. 1, 2007

(65) Prior Publication Data
US 2007/0206817 A1   Sep. 6, 2007

(30) Foreign Application Priority Data
Mar. 3, 2006   (JP) .................. 2006-057085

(51) Int. Cl.
*H04M 9/08* (2006.01)
(52) U.S. Cl. .................. 379/406.08; 381/71.11
(58) Field of Classification Search ......... 381/70–71.14, 381/305; 379/406.01–406.16
See application file for complete search history.

(56) References Cited

U.S. PATENT DOCUMENTS

| | | | | |
|---|---|---|---|---|
| 5,724,485 | A * | 3/1998 | Rainton ........................ | 706/14 |
| 5,987,143 | A * | 11/1999 | Okuno et al. ................ | 381/66 |
| 6,185,301 | B1 * | 2/2001 | Muraoka .................. | 379/406.08 |
| 6,442,274 | B1 * | 8/2002 | Sugiyama ................ | 379/406.08 |
| 6,700,978 | B2 * | 3/2004 | Bershad et al. ......... | 379/406.08 |
| 2002/0093919 | A1 * | 7/2002 | Bershad et al. ........... | 370/286 |

FOREIGN PATENT DOCUMENTS

| | | |
|---|---|---|
| JP | 48-027605 | 4/1973 |
| JP | 01-216631 | 8/1989 |
| JP | 10-242891 | 9/1998 |
| JP | 11-313014 | 11/1999 |
| JP | 2000-307485 | 11/2000 |
| JP | 2004-357053 | 12/2004 |

OTHER PUBLICATIONS

Japanese Office Action issued on May 26, 2009, for corresponding Japanese Patent Application JP 2006-057085.

* cited by examiner

*Primary Examiner* — MD S Elahee
*Assistant Examiner* — Akelaw Teshale
(74) *Attorney, Agent, or Firm* — K&L Gates LLP

(57) ABSTRACT

An audio processor of a loud speech communication system including a speaker and a microphone is provided. The audio processor includes: an adaptive filter wherein an amount of update in a learning event is set to an arbitrary value, and a filter coefficient is serially determined corresponding to the set amount of update; a semi-fixed filter adapted to an echo cancellation process of an audio input signal input from the microphone; adaptive filter assessment unit that calculates a length of an update vector based on the filter coefficient determined by the adaptive filter and a length of an update vector based on a filter coefficient set in the semi-fixed filter and that performs assessment of the filter coefficients in accordance with the update vectors; and coefficient specifying unit that sets an optimal filter coefficient among the filter coefficients into the semi-fixed filter in accordance with the result of the assessment of the filter coefficients performed by the adaptive filter assessment unit.

10 Claims, 12 Drawing Sheets

AUDIO PROCESSOR

CROSS REFERENCES TO RELATED APPLICATIONS

The present application claims priority to Japanese Patent Application JP 2006-057085 filed in the Japanese Patent Office on Mar. 3, 2006, the entire contents of which is being incorporated herein by reference.

BACKGROUND

The present disclosure relates to an audio processor. More specifically, the disclosure relates to an audio processor of a loud speech communication system.

As communication systems, there are known such as hands-free telephone and video conference systems each including a speaker and microphone. A system of that type, for example, while communication is carried out between a far endpoint device and a near endpoint device that are connected across a network, audio received by a microphone of the far endpoint device is transmitted to the near endpoint device, and the audio is output from a speaker of the near endpoint device (unless otherwise specifically stated or mentioned, the term "audio" hereinbelow is used to refer to any one of such terms "voice" and "speech"). On the other hand, also audio received by a microphone of the near endpoint device is transmitted to the far endpoint device, and the audio is output from a speaker of the far endpoint device. As such, the audio output from the speaker of the destination device is input to the microphone of the respective far endpoint, near endpoint device. In the case that no processes are carried out thereon, since the audio is again transmitted to the destination device, such that there occur a phenomenon called "echo" in which one's own utterance is heard as echo from the speaker with some time delay. When the echo is enlarged, it is again supplied or fed back to the microphone, thereby causing howl.

As a previously developed technique such as described above, there is known an echo canceller that servers as an audio processor to prevent such echo and howl. Generally, the echo canceller cancels echo in the following manner. An adaptive filter are used to learn an impulse response between a speaker and a microphone, and the learned impulse response is convolved with a reference signal output from the speaker to thereby generate a pseudo or artificial echo ("pseudo echo," hereinbelow). Assuming the pseudo echo to be audio output from the microphone, the echo is subtracted from the audio input from the microphone, thereby to implement echo cancellation. Generally, it is determined that the adaptive filter coefficients are more superior as filter error (difference between the microphone input signal and the pseudo echo) is smaller.

In impulse response learning such as described above, the adaptive filter coefficients become fluctuated depending on, for example, positional and environmental variations of a near endpoint talker, so that the coefficients have to be all time learned following the variations. Under these circumstances, echo cancellers of the type that controls the step size, for example, have been proposed. In this case, the step size is used to determine the adaptive filter coefficients in accordance with the output signal and power of filters that pass only specific band components. For an example of such echo cancellers, refer to Japanese Unexamined Patent Application Publication No, 2004-357053 (par. No. 0032 to No. 0041, and FIG. 1).

According to such a previously proposed example of an echo canceller, however, in an area where an audio signal-to-disturbance ratio is small, the adaptive filter coefficients are stabilized by reducing the step size. In addition, in the state where the audio signal-to-disturbance ratio is increased, and disturbance influence is small, step size control is carried out such that the step size is increased to obtain a high convergence speed.

However, the echo cancellation process such as described above has a problem. The process is effective in a single talk state or mode in which a far endpoint talker is absent in communication and only the reference signal is being output to a speaker. However, in a double talk mode both near endpoint and far end point talkers are in communication, the cancellation process can runs into the problem of causing degradation of the adaptive filter coefficients.

More specifically, in the double talk mode, together with speech of the near endpoint talker, the speaker output audio with the far endpoint talker speech being added is input into the microphone. In other words, in the adaptive filter processing, not only echo components, but also the speech of the far endpoint talker is input as disturbance into the microphone. As such, with adaptive filter coefficients set corresponding to the amount of error, there occurs the problem of setting incorrect filter coefficients causing cancellation of speech of the far endpoint talker. Consequently, the adaptive filter coefficients are degraded, thereby causing echo.

Such a problem similarly occurs in performing the step size control. Although the step size is minimized for the reason that the disturbance ratio is large in the double talk event, the result thereof leads to setting of incorrect filter coefficients. When inappropriate adaptive filter coefficients are once set, it takes time for recovery, and the output audio is not stabilized before recovery.

Accordingly, it would be desirable to provide an audio processor capable of restraining the influence of disturbance due to fluctuations in double talk or the like, providing filter coefficients steady and less corruptible, and exhibiting high speed convergence (high followability to system variations).

SUMMARY

According to an embodiment an audio processor of a loud speech communication system including a speaker and a microphone includes an adaptive filter, a semi-fixed filter, an adaptive filter assessment unit, and a coefficient specifying unit. In the adaptive filter, an amount of update in a learning event is set to an arbitrary value, and a filter coefficient is serially determined corresponding to the set amount of update. The semi-fixed filter is adapted to an echo cancellation process of an audio input signal input from the microphone. The adaptive filter assessment unit calculates a length of an update vector based on the filter coefficient determined by the adaptive filter and a length of an update vector based on a filter coefficient set into the semi-fixed filter and that performs assessment of the filter coefficients in accordance with the update vectors. The coefficient specifying unit sets an optimal filter coefficient among the filter coefficients into the semi-fixed filter in accordance with the result of the assessment of the filter coefficients performed by the adaptive filter assessment unit.

According to the audio processor, in the adaptive filter, the amount of update in the learning event is set to the arbitrary value, and the filter coefficient corresponding to the set amount of update is serially determined in accordance with an audio signal input from the microphone and a reference signal. The semi-fixed filter performs the process of canceling echo from the audio signal input from the microphone by using the filter coefficient set by the coefficient specifying unit. The adaptive filter assessment unit calculates the length of the update vector based on the filter coefficient of the adaptive filter and the length of the update vector based on the filter coefficient of the semi-fixed filter, and performs assessment of the filter coefficients in accordance with the update vectors. A small length of the update vector means that the filter coefficient need not be updated, that is, the filter coefficient is near a correct solution, such that a high level assessment is obtained. The coefficient specifying unit sets the optimal filter coefficient into the semi-fixed filter in accordance with the result of the assessment of the filter coefficients performed by the adaptive filter assessment unit.

In the above, the configuration can be such that a plurality of the adaptive filters each having a different amount of update are provided, and an optimal filter coefficient of an adaptive filter is selected in accordance with the result of the assessment. Further, the configuration can be such that the amount of update for the adaptive filter is set to an arbitrary value correspondingly to the result of the assessment.

According to the audio processor described above, the filter coefficient of the adaptive filter, which coefficient is set to the arbitrary value, is assessed corresponding to the length of the update vector, whereby the optimal filter coefficient can be selected and set into the semi-fixed filter. The length of the update vector is smaller as it is closer to a correct solution (a calculated pseudo echo component is the same as a real echo component), such that it is possible to assess whether the filter coefficient of the adaptive filter is accurate correspondingly to the length of the update vector. Consequently, the filter coefficient closest to the correct solution can be used for the echo cancellation process. In particular, since the length of the update vector is increased by disturbance occurring in double talk or the like, the influence of the disturbance can be suppressed in the manner that the filter coefficient is selected by using the assessment performed in accordance with the length of the update vector.

Additional features and advantages are described herein, and will be apparent from, the following Detailed Description and the figures.

DETAILED DESCRIPTION

Embodiments of the are described herebelow with reference to the accompanying drawings. Concepts of the embodiments will first be described, and then the contents of the embodiments will be described in detail.

Figure 1:
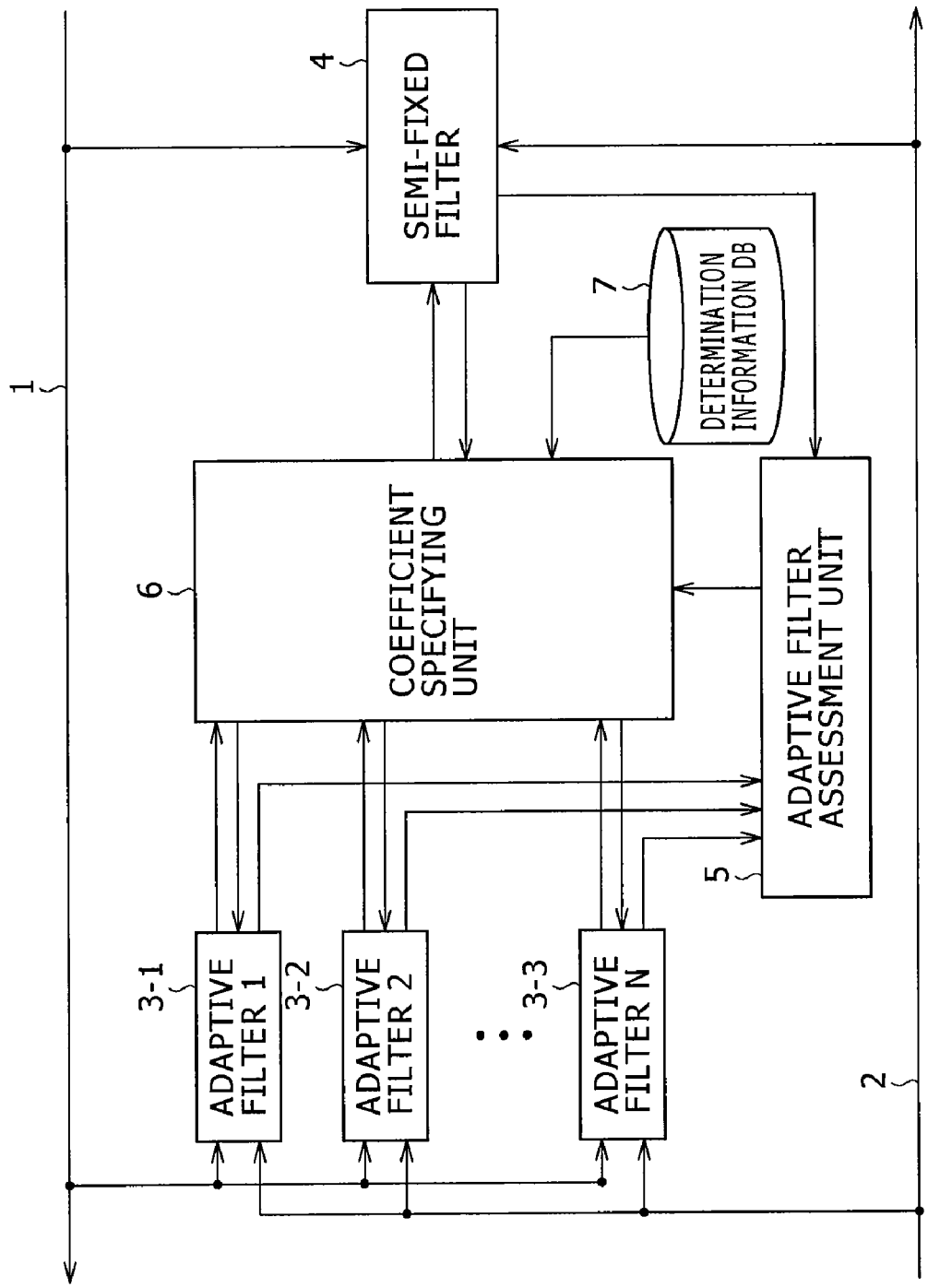
FIG. 1 is a conceptual view of an exemplary configuration of an embodiment.

FIG. 1 is a conceptual view of an exemplary configuration of an embodiment.

An exemplary audio processor embodiment includes N (integer) adaptive filters 1(3-1) to N(3-3) in which amounts of updates different from one another are set; a semi-fixed filter 4 or a processing filter adapted to perform an audio process; an adaptive filter assessment unit 5 that assesses the respective adaptive filter by using the lengths of update vectors that are based on filter coefficients; a coefficient specifying unit 6 that sets filter coefficients of the semi-fixed filter 4; and a determination information database (DB) 7 that stores determination information. When not necessary to be specific, each of the adaptive filters 1(3-1) to N(3-3) hereinbelow will be referred to or indicate as "adaptive filter (3-n).

The adaptive filters 1(3-1) to N(3-3) each calculates an estimate value of an echo component included in a microphone input signal 2, which is an audio signal input from a microphone, from a reference signal 1 that is based on an audio signal being output to a speaker, subtracts the calculated estimate value from the microphone input signal 2, and then updates the filter coefficients in accordance with a predetermined adaptive algorithm. When the amount of update is set to a relatively large amount, while the speed of coefficient convergence is increased, the coefficients are prone to be corrupted by sounds other than echo. Conversely, when the amount of update is set to a relatively small amount, while the coefficients are less prone to corruption, the speed of coefficient convergence is reduced. Filter coefficients of the adaptive filter (3-n) are readable from the adaptive filter assessment unit 5, and are readable and writable from the coefficient specifying unit 6.

The semi-fixed filter 4 inputs the reference signal 1 and the microphone input signal 2. Then, the filter 4 calculates an estimate value of an echo component included in the microphone input signal 2 in accordance with the filter coefficient set by the coefficient specifying unit 6, and subtracts the calculated estimate value from the microphone input signal 2, thereby performing echo cancellation processing. Filter coefficients of the semi-fixed filter 4 are readable from the adaptive filter assessment unit 5, and readable and writable from the coefficient specifying unit 6. Unlike the case of the adaptive filter (3-n) that serially updates the filter coefficients, the filter coefficients of the semi-fixed filter 4 are fixed to set values, except when being updated by the coefficient specifying unit 6.

The adaptive filter assessment unit 5 calculates lengths (or values) of update vectors for the adaptive filters 1(3-1) to N(3-3), and assesses the filter coefficients of the filters in accordance with the calculated lengths of update vectors. The update vectors are described further in detail below. Meanwhile, a case is assumed in which w(n) is a coefficient vector (order P) of the vector sequence $\{w_0, w_1, \ldots, w_{p-1}\}$ of an adaptive filter and x(n) is a coefficient vector (order P (same as above) of the time zone data vector sequence $\{x_t, x_{t-1}, x_{t-2}, \ldots, x_{t-(p-1)}\}$) of the reference signal in a n-th echo cancellation process. In this case, a (n+1)th coefficient vector can be represented by Equation (1) below.

$$w(n+1)=w(n)+\mu\{a_1(n)\times(n)+a_2(n)\times(n-1)\} \quad (1)$$

In the above, $\mu$ is an update step size, and the righthand part $\{a_1(n)\times(n)+a_2(n)\times(n-1)\}$ corresponds to an update vector. The (n+1)th coefficient vector w(n+1) is determined in accordance with the update vector and the step size. The length of the respective update vector can be obtained by calculation of an absolute value of the update vector. In the present case, a large update vector causes a large fluctuation amount of the filter coefficient. As such, in the event of a small update vector, the filter coefficients need not be varied; that is, the filter coefficients are close to correct solutions, such that high level assessments are obtained. As such, the adaptive filter assessment unit 5 assesses and determines whether the respective filter coefficients are close to correct solutions in accordance with the lengths of the calculated update vectors. The filter coefficients of the semi-fixed filter 4 are assessed in a similar manner to the above described. The assessment results are notified or supplied to the coefficient specifying unit 6.

In correspondence to the determination results obtained by the adaptive filter assessment unit 5, the coefficient specifying unit 6 selects optimal filter coefficients for the adaptive filter (3-n), and copies the selected filter coefficients to the filter coefficient of the semi-fixed filter 4. In order to change or replace the filter coefficients of the semi-fixed filter 4, the selected filter coefficients are not copied solely after a single assessment, but is copied in the following manner. In the adaptive filter (3-n), in the event that a reference value of amount of echo cancellation is successively exceeded a predetermined number of times, then it is determined that an update criterion is satisfied, and the filter coefficients are copied. In this case, the determination is made by reference to determination criteria stored in the determination information DB 7. A case can take place in which it is determined that a state in which the lengths of the update vectors of the respective adaptive filter (3-n) are larger than predetermined criteria (the lengths of the update vectors of the semi-fixed filter 4, for example) successively occurs a predetermined number of times or more. In this case, the filter coefficients of the semi-fixed filter 4 are set to the filter coefficients of the adaptive filter (3-n). Thereafter, the process of thus setting the filter coefficient of the semi-fixed filter 4 to the filter coefficient of the adaptive filter (3-n) is reversely copied.

The determination information DB 7 is a storage device that stores information related to determination, such as threshold value information and work information. The threshold value information is used as, for example, determination criteria for "the number of times that the update vector has to be successively below the reference value" so that the adaptive filter (3-n) is determined to satisfy the copying criterion (or condition) referenced by the coefficient specifying unit 6. The work information includes, for example, the number of times the respective adaptive filter (3-n) exceeds the reference value.

Operation of the audio processor configured as described above are described herebelow.

In each of the adaptive filters 1(3-1) to N(3-3), the amount of update in a learning event is set to a different value, and the reference signal 1 and the microphone input signal 2 are input, in which the filter coefficients are serially or sequentially updated in accordance with a predetermined adaptive algorithm. Predetermined filter coefficients are set into the semi-fixed filter 4, in which the reference signal 1 and microphone input signal 2 are input, and a pseudo echo component is calculated and subtracted from the microphone input signal 2, thereby canceling echo from the microphone input signal 2.

For the respective adaptive filter (3-n), the adaptive filter assessment unit 5 operates as follows. The length of update vector, which is calculated in accordance with the filter coefficient set into the respective adaptive filter (3-n) is compared with a reference value of the length of update vector, such as the length of update vector set into the semi-fixed filter 4. Thereby, the filter coefficients of the respective adaptive filter (3-n) are assessed.

The coefficient specifying unit 6 determines whether the forward copying condition or reverse copying condition is satisfied in accordance with the resultant assessment. If satisfied, then the forward copying or reverse copying process is carried out. In this case, the forward copying condition is set to the condition of whether the adaptive filter (3-n) is successively below the reference value, and it is determined in accordance with the set condition whether the forward copying condition is satisfied. The number of times that the adaptive filter (3-n) successively exceeds the reference value, which is used as the forward copying condition, can be set corresponding to the priority of the adaptive filter (3-n).

In the case that the number of times of a high priority adaptive filter (3-n) is set, the filter coefficients of the high priority adaptive filter (3-n) are copied preferentially. Thereby, the filter coefficients of the semi-fixed filter 4 are updated to even more appropriate values. The same number of times the adaptive filter (3-n) is successively below the reference value, which is used as the forward copying condition, is set for each of the all adaptive filters (3-n), in which a to-be-selected adaptive filter (3-n) is determined in accordance with the predetermined priority.

Further, conversely to the case of the forward copying condition, the number of times the adaptive filter (3-n) successively exceeds the reference value is set to the reverse copying condition, in which the filter coefficients of the semi-fixed filter 4 are copied to the filter coefficients of an adaptive filter (3-n) for which the reverse copying condition is determined to be satisfied. Thus, the semi-fixed filter is updated when it is determined that filter coefficients of an adaptive filter are more suitable, whereby an optimal filter coefficient at the corresponding time point is all time set into the semi-fixed filter. A filter coefficient copy source is a filter coefficient of a most efficient one of the plurality of adaptive filters with the amounts of update different from one another. In this case, the plurality of adaptive filters are ranged from an adaptive filter with a large amount of update and high followability to the system variations to an adaptive filter with a small amount of update and filter coefficients prone to be corruption. Consequently, both the followability to the system variations and filter coefficients stability can be attained.

Further, even when the coefficients are significantly corrupted in the respective adaptive filter, filter coefficients are reversely copied from the semi-fixed filter, whereby the filter coefficients are corrected to those assessed to be even more correct or appropriate. In this manner, all the adaptive filters are enabled to correct their filter coefficients to one another through the semi-fixed filter.

Referring to the drawings, the embodiment is described in further detail with reference to an example in which the embodiment is adapted to an audio processing section of a video conference system.

Figure 2:
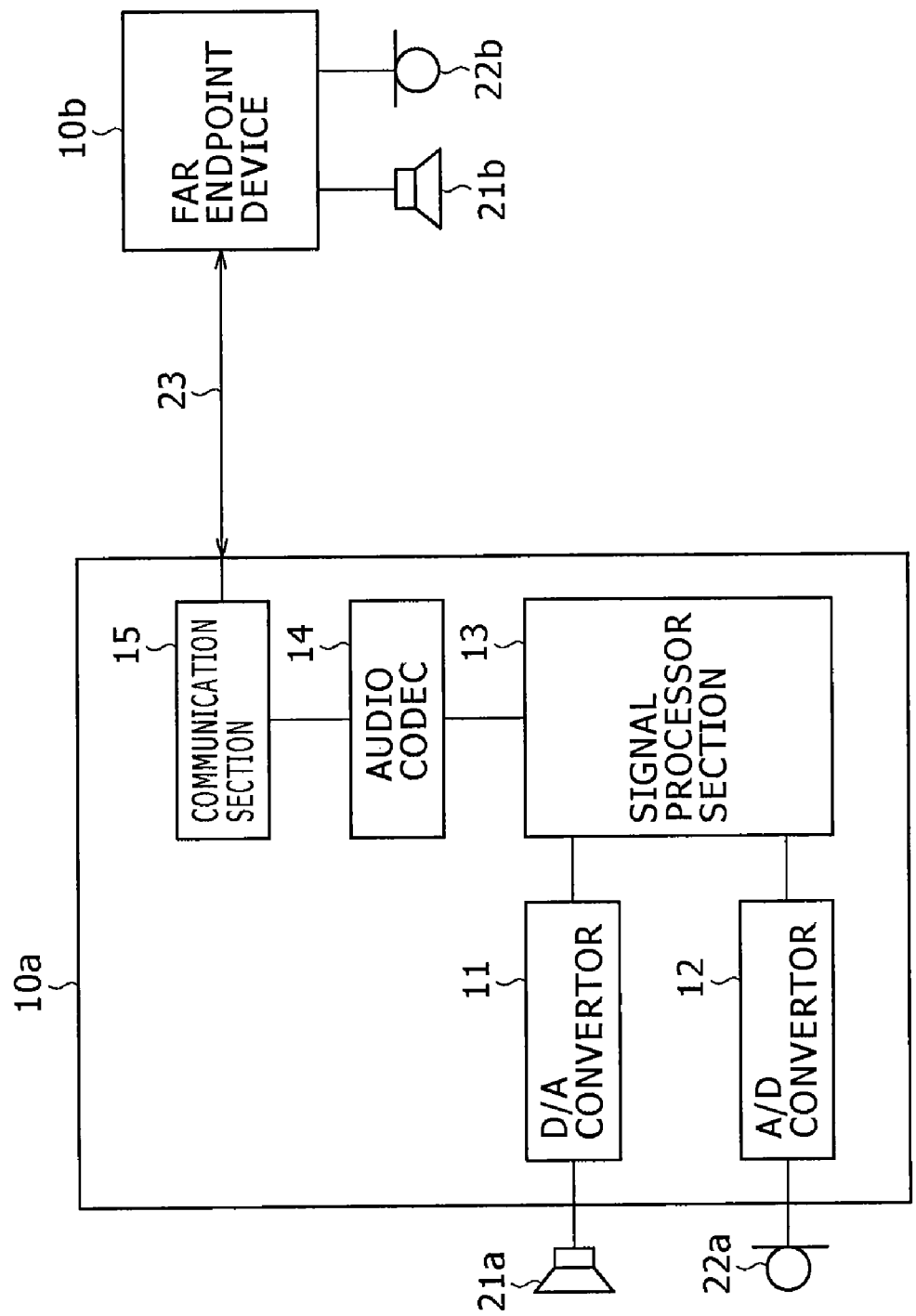
FIG. 2 is a view showing the configuration of a video conference system in accordance with the embodiment.

FIG. 2 is a view showing the configuration of the video conference system in accordance with the embodiment. Processing sections not related to description of the embodiment are omitted from FIG. 2.

In the video conference system of the present embodiment, a conference terminal 10a connected to a speaker 21a and a microphone 22a is connected through a communication line 23 to a conference terminal 10b connected to a speaker 21b and a microphone 22b. The conference terminal 10a disposed close to an arbitrary talker will be alternatively referred to as a "near endpoint device 10a." The conference terminal 10b connected through the communication line 23 to the near endpoint device 10a and located far from the talker will alternatively referred to as a "far endpoint device 10b." The configurations of the near endpoint device 10a and the far endpoint device 10b are similar to one another, such that an interior block diagram of the far endpoint device 10b is omitted in FIG. 2. The communication line 23 is a general digital communication line, such as Ethernet™.

The speaker 21a, which is connected to the conference terminal 10a, outputs audio data transmitted from the conference terminal 10b and processed in the conference terminal 10a. The microphone 22a, which is connected to the conference terminal 10a, receives voiced speech of a video conference participant in the near endpoint device 10a. In this case, the voiced audio is received by being convolved with audio input through space and output from the speaker 21a. The above is similar as in the far endpoint device 10b.

The interior configuration of the near endpoint device 10a will be described herebelow (Description given herebelow covers also the interior configuration of the far endpoint device 10b, which is, as described above, similar to that of the near endpoint device 10a).

The near endpoint device 10a includes a D/A (digital/analog) converter 11 connected to the speaker 21a, an A/D converter 12 connected to the microphone 22a, a signal processing section 13 for processing audio signals, an audio codec 14 for performing encoding and decoding processes of audio signals, and a communication section 15 connected to the communication line 23.

The D/A converter 11 converts digital audio data (signal) processed in the signal processing section 13 to an analog audio signal. The analog audio signal is amplified by an amplifier (not shown), and then is output from the speaker 21a. The A/D converter 12 converts into digital audio data an analog audio signal received by the microphone 22a and amplified by an amplifier (not shown).

The signal processing section 13, generally, is configured from a digital signal processor (DSP), and executes conversion processing to convert input and output audio data to desired data, and in addition, executes an echo cancellation process to cancel echo from the input audio data. The echo cancellation process will be described in detail below.

The audio codec 14 converts audio data based on an input to the microphone 22a, which is supplied from the signal processing section 13, into a code standardized for video conference system communication. In addition, the audio codec 14 decodes audio data encoded by the far endpoint device 10b and supplied from the communication section 15, and supplies the decoded audio data to the signal processing section 13.

The communication section 15 performs the transmission and reception or the communication of input and output data inclusive of encoded audio data with the far endpoint device 10b through the communication line 23 in accordance with a predetermined digital data communication protocol.

An audio process in the near endpoint device 10a configured as above will be described below.

Figure 3:
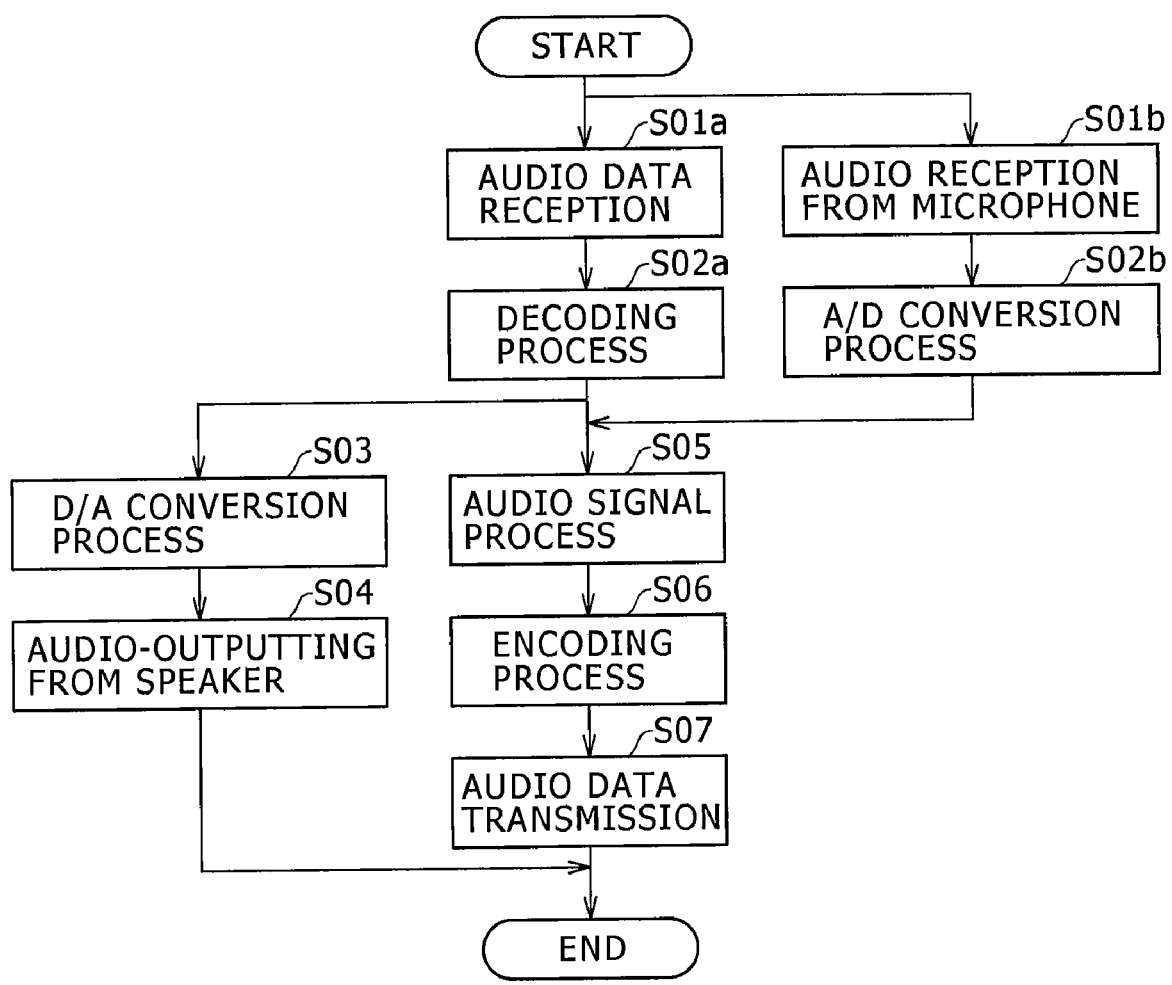
FIG. 3 is a flow diagram showing a processing procedure being carried by a near endpoint device (audio processor) in accordance with the embodiment.

FIG. 3 is a flow diagram showing a processing procedure to be carried by the near endpoint device 10a (audio processor) in accordance with the embodiment.

Concurrently with reception of audio data from the far endpoint device 10b, the near endpoint device 10a processes audio data received by the microphone 22a. First, a data receiving process for receiving data from the far endpoint device 10b is described below.

(Step S01a): In the near endpoint device 10a, the communication section 15 receives encoded audio data transmitted through the communication line 23 from the far endpoint device 10b. The received data is supplied to the audio codec 14.

(Step S02a): In step S02a, the audio codec 14 decodes the received data and supplies it in the form of 32-kHz sampling 16-it straight PCM digital audio data to the signal processing section 13. The digital audio data is also supplied to the D/A converter 11 through the signal processing section 13.

Concurrently with the above, a process of the audio data received by the microphone 22a is executed, and the process is described herebelow.

(Step S01b): The captioned step, the microphone 22a receives audio around the near endpoint device 10a. As such, the input signal of the microphone 22a includes the audio signal output from the speaker 21a in addition to speech of a talker(s) present around the near endpoint device 10a.

(Step S02b): The input signal of the microphone 22a is converted by the A/D converter 12 into digital audio data and supplied to the signal processing section 13.

By execution of the processing procedure described above, the audio data of the far endpoint device 10b is input into the D/A converter 11. In addition, the audio signal of the far endpoint device 10b and the input signal received by the microphone 22a are input into the signal processing section 13.

(Step S03): The D/A converter 11 converts the digital audio data supplied in step S02a into an analog signal.

(Step S04): The analog signal generated in step S03 is amplified by the amplifier (not shown), and then is output from the speaker 21a.

Together with the input signal of the microphone 22a, audio data the far endpoint device 10b are input as a reference signal into the signal processing section 13. In the present example, it is assumed that the reference signal and the input signal of the microphone 22a are all time supplied thereto in units of one sample with the same timing.

(Step S05): In accordance with the reference signal input in step S02a, the signal processing section 13 executes an audio signal process that cancels an echo component from the input signal of the microphone 22a input in step S02b. The process will be described in detail below.

(Step S06): The input signal, from which the echo component was cancelled by the signal processing section 13, is encoded in the audio codec 14 to a predetermined code, and then is supplied to the communication section 15.

(Step S07): The communication section 15 transmits the audio data encoded in the audio codec 14 to the far endpoint device 10b through the communication line 23.

Thus, the near endpoint device 10a outputs from the speaker 21a audio data, from which the echo component was cancelled by the far endpoint device 10b. In addition, the near endpoint device 10a transmits audio data to the far endpoint device 10b, in which the audio data is generated by canceling the echo component, which was derived from the output audio from the speaker 21a, from the input signal received by the microphone 22a.

The signal processing section 13 is described in detail below by way of first to third exemplary embodiments.

First Exemplary Embodiment

In the first exemplary embodiment, the configuration is formed to include a plurality of adaptive filters with amounts of update different from one another.

Figure 4:
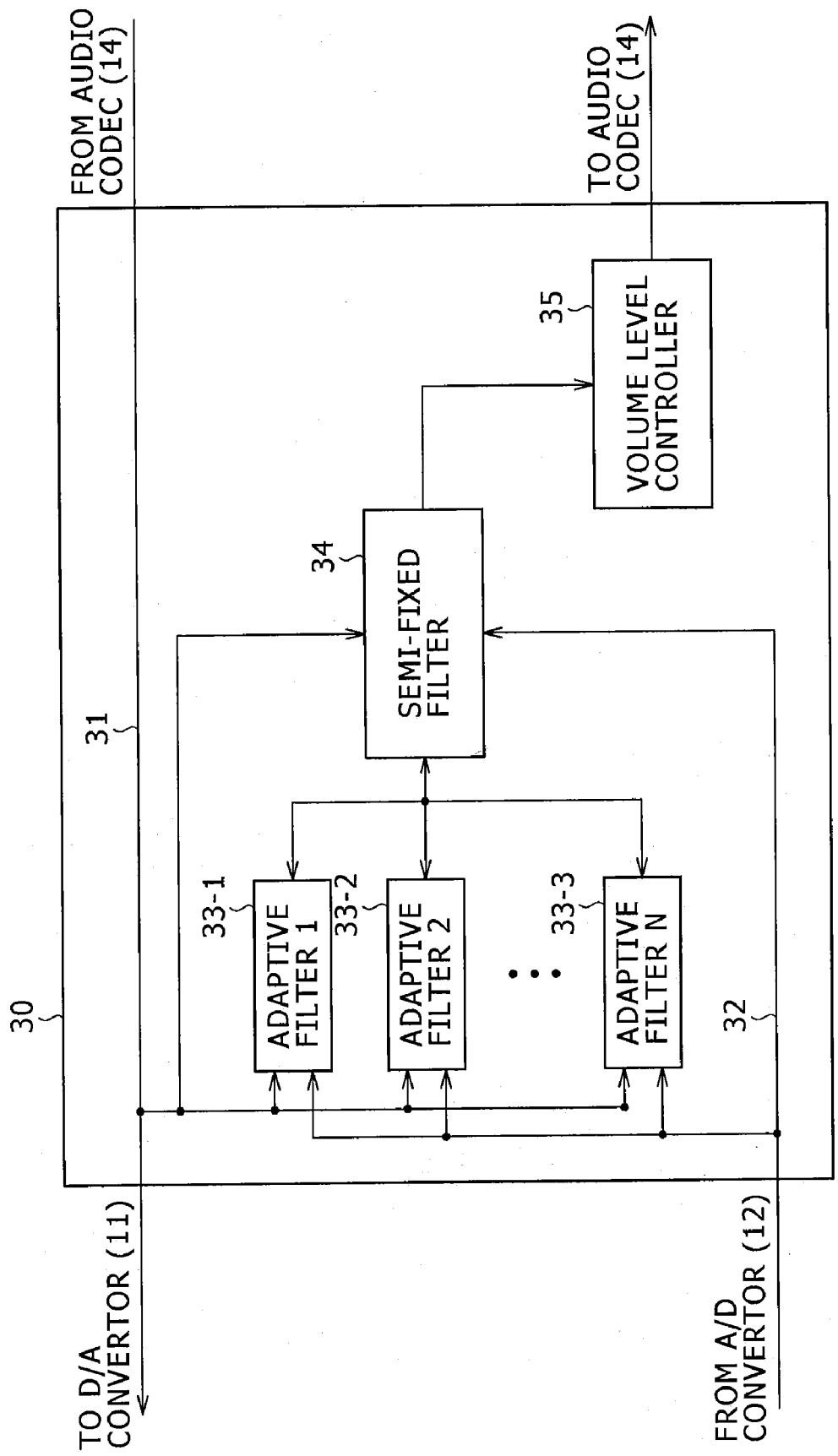
FIG. 4 is a view showing the configuration of a signal processor section of a first exemplary embodiment.

FIG. 4 is a view showing the configuration of a signal processor section 30 of the first exemplary embodiment. The signal processor section 30 is assembled in the signal processing section 13 of the conference terminal 10a (or 10b) shown in FIG. 2.

A reference signal 31 is audio data that is input from the audio codec 14 and that is output from the speaker 21 a through the D/A converter 11.

A microphone input signal 32 is an audio signal received by the microphone 22a. The audio signal is input through the A/D converter 12, is subjected to the echo cancellation process, and then is output to the audio codec 14.

The signal processor section 30 has adaptive filters 1(33-1) to N(33-3) for which step sizes for controlling the amounts of update are different from one another, and a semi-fixed filter 34. The reference signal 31 and the microphone input signal 32 are input into the signal processor section 30. The reference signal 31 and the microphone input signal 32, respectively, are all time supplied in unit of one sample.

The adaptive filters 1(33-1) to N(33-3), respectively, are adaptive filters with the step sizes (μ) different from one another. The step size is a parameter used to control the amount of update for the adaptive filter. As shown in Equation (1), the larger the step size (μ) is, the larger the amount of update is; and the smaller the step size (μ) is, the smaller the amount of update is.

The semi-fixed filter 34 calculates a pseudo echo component from the reference signal 31, cancels echo by subtracting the pseudo echo component from the microphone input signal 32, and supplies the resultant signal to the audio codec 14. In accordance with assessments corresponding to the lengths of update vectors, which assessments are provided by an adaptive filter assessment section (not shown), filter coefficients of an adaptive filter having a highest assessment is set to the filter coefficients of the semi-fixed filter 34.

A volume level controller 35 controls an output volume level in accordance with the lengths of the update vectors, such as the above-described lengths of the update vectors of the adaptive filter with the highest assessments provided by the adaptive filter assessment section (not shown). In a practical echo cancellation process, filter coefficients cannot be completely correct solutions due to small system variations caused by human-being movement and the like, such that there occurs residual echo (uncancelled echo). In a single talk mode or state, while the update vector in the adaptive filter is enlarged until being stabilized from the initiation time of the process, the vector is varied to the direction of reduction eventually as being converged. However, in a double talk mode or state, the update vector abruptly takes a large value. The state is detected, it is determined whether the state is the single or double talk state, and then the volume level is controlled. More specifically, in the state where the update vector is reduced, then the state is determined to be the single talk state, and the output signal of the semi-fixed filter 34 after the echo cancellation process is muted (or disabled). Alternatively, the processing can be such that the sound volume can be reduced. Conversely, if the update vector is increased, the state is determined to be the double talk state, and the output signal after the echo cancellation process is transmitted as it is to the destination device. Thereby, uncancelled residual echo can be suppressed without impairment of the speech or audio in the double talk event.

Figure 5:
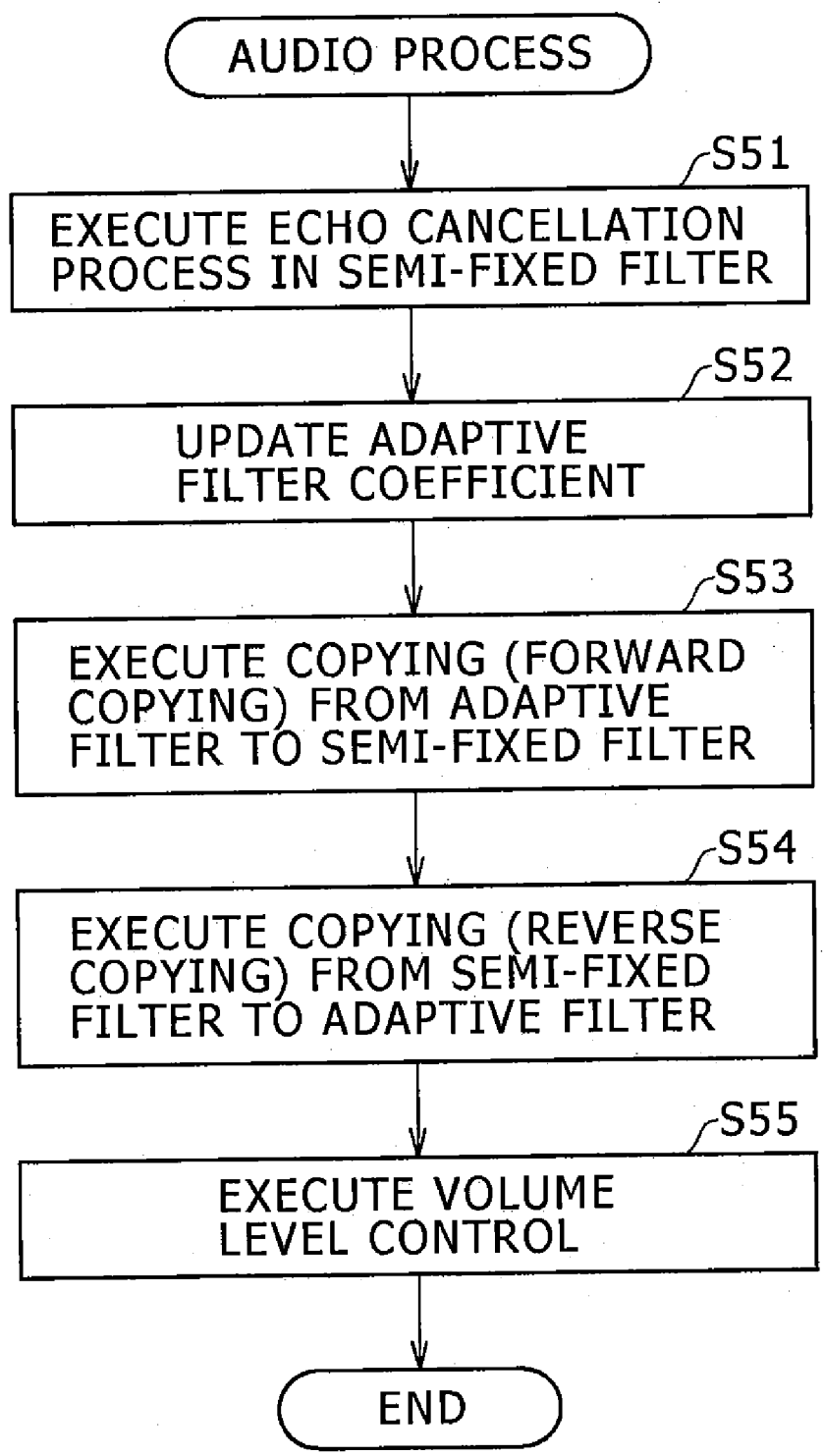
FIG. 5 is a flow diagram showing a processing procedure being carried out by the signal processor section of the first exemplary embodiment.

A general flow of the process in the signal processor section 30 described above is described herebelow. FIG. 5 is a flow diagram showing a processing procedure being carried out by the signal processor section of the first exemplary embodiment.

The process is initiated upon being supplied with one sample of each of the reference signal 31 and the microphone input signal 32.

(Step S51): First, the echo cancellation process is executed by using a filter coefficient of the semi-fixed filter 34. In the echo cancellation process, a calculation is carried out to thereby obtain an estimate value y(t) of an echo component contained in the microphone input signal 32 at time t, which signal is the processing target of the echo cancellation process, in accordance with Equation (2) below.

$$y(t) = w(n)x(n) = \sum_{m=0}^{p-1} w_m x_{t-m} \qquad (2)$$

Then, the calculated value is subtracted (echo-cancelled) from the value of the microphone input signal 32, and is supplied to the audio codec 14.

As described in the earlier portion, w(n) is the coefficient vector (order P) of the vector sequence $\{w_0, w_1, \ldots, w_{p-1}\}$ of an adaptive filter and x(n) is the coefficient vector (order P (same as above) of the time zone data vector sequence $\{x_t, x_{t-1}, x_{t-2}, \ldots, x_{t-(p-1)}\}$) of the reference signal in the n-th echo cancellation process.

In addition, t-1 represents the time corresponding to a one-turn previous echo cancellation process, and t-2 represents the time corresponding to a two-turn previous echo cancellation process. The respective times are arranged at fixed interval.

(Step S52): In the respective adaptive filter 1(33-1), 2(33-2), N(33-3), an estimate value y(t) of an echo component at time t contained in the microphone input signal 32 (echo cancellation process target) is calculated in accordance with Equation (1). Subsequently, a resultant value of subtraction of the estimated value y(t) from the microphone input signal 32 is set as an error signal (e)n, and an (n+1)th turn coefficient vector w(n+1) is determined by using, for example, Equation (1) and Equation (3) shown below.

$$\begin{bmatrix} a_1(n) \\ a_2(n) \end{bmatrix} = \begin{bmatrix} x(n)^T x(n) & x(n)^T x(n-1) \\ x(n-1)^T x(n) & x(n-1)^T x(n-1) \end{bmatrix}^{-1} \begin{bmatrix} e(n) \\ (1-\mu)e(n-1) \end{bmatrix} \qquad (3)$$

The order P of the coefficient vector is called "tap length" of the adaptive filter. When the tap length is set to be small, while the coefficient convergence is fast, a coefficient convergence limit is low. In contrast, when the tap length is set to be large, while the coefficient convergence limit is high, the coefficient convergence is slow. Thus, even when the tap length is varied, similar effects can be obtained as in the case where the step size is varied. As such, the adaptive filters 1(33-1) to N(33-3), respectively, can be configured with the varied tap lengths. Not only such the updating method, but also some other methods are available; however, the properties are slightly different depending on an employed updating equation.

(Step S53): Forward copy determination is carried out for forward copying to the semi-fixed filter 34 from the adaptive filters 1(33-1) to N(33-3). Among the coefficients of the adaptive filters having satisfied the forward copying condition, the coefficient of an adaptive filter with highest priority is copied into the semi-fixed filter 34. The forward copying process is described further below in detail.

(Step S54): Reverse copy determination is carried out for reverse copying to the adaptive filters 1(33-1) to N(33-3) from the semi-fixed filter 34. The coefficient of the semi-fixed filter 34 is copied into the adaptive filters having satisfied the reverse copying condition. The reverse copying process is described further below in detail.

(Step S55): The volume level of an audio output signal after the echo cancellation process is controlled corresponding to the length of an update vector based on the coefficient of the highest priority adaptive filter selected in step S53. The volume level is controlled in the following manner, for example. The length of the update vector is compared to a predetermined threshold value. If the length is blow the threshold value, then the state is determined to be the single talk state, and a muting process is executed. Alternatively, if the volume level exceeds the threshold value, the state is determined to be the double talk state, and the volume level is maintained. In this case, the volume level can be calculated as a function of the absolute value of the update vector, in which the minimum value is set to volume level 0 (for muting), and the maximum value of the absolute value of the update vector is set to volume level 1 (for not reducing the volume).

Figure 6:
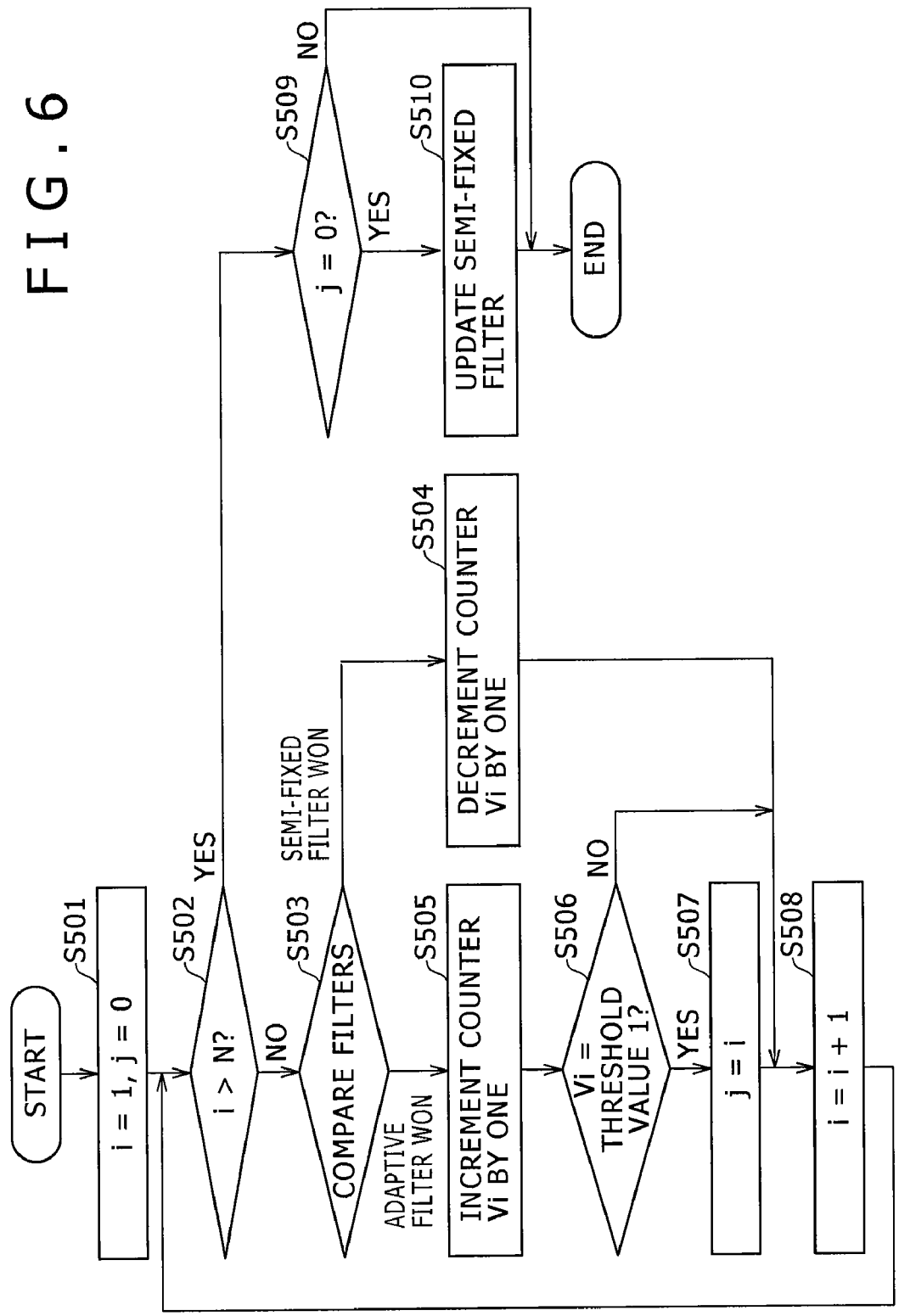
FIG. 6 is a flow diagram showing a procedure of a forward copying process being executed before a reverse copying process in the first exemplary embodiment.

The forward copying process is described in further detail below. FIG. 6 is a flow diagram showing a procedure of the forward copying process being executed before the reverse copying process in the first exemplary embodiment. In the present example, it is assumed that the adaptive filters are consecutively numbered from 1 to N in order of smaller step sizes set therein. As such, the Nth is assigned to an adaptive filter in which the largest step size is set, and the priority of the filter is highest. In addition, initial values of respective number-of-wins counters V1 to VN are each set to 0.

(Step S501): Two disposable variables i and j are initialized. The variable i corresponds to an adaptive filter being compared with the semi-fixed filter, and is initialized to 1 (the minimum number allocated to the adaptive filter). The variable j is used to memorize a highest priority adaptive filter of adaptive filters having satisfied the forward copying condition, and is initialized to 0 (no adaptive filter satisfying the forward copying condition). In description herebelow, an i-th adaptive filter will be referred to as "adaptive filter (i). (Step S502): The variable i, which designates a target adaptive filter, is compared with the total number (N) of the adaptive filters. If i is greater than N, then it is determined that the process for the all adaptive filters has been completed, and the process proceeds to step S509. Alternatively, the processes of step S503 and subsequent steps are executed for the target adaptive filter designated by i (i.e., adaptive filter (i)).

(Step S503): The adaptive filter (i) is compared with the semi-fixed filter. In the present case, the adaptive filters are compared in the manner that the absolute values of update vectors calculated from the respective filter coefficients are compared with one another, and an adaptive filter with a smaller value is determined to be a won adaptive filter. That is, as already described above, it can be taken that as the absolute value of the update vector is smaller, the filter coefficient is closer to the correct solution. If the semi-fixed filter wins (the comparison), then the process proceeds to step S504; otherwise, if the adaptive filter wins, the process proceeds to step S505. Although not often, draw events can take place. In the present example case, also in a draw event, it is determined that the adaptive filter has won.

(Step S504): In the event that the semi-fixed filter has won (the comparison), then it is determined that the filter coefficient of the semi-fixed filter is suitable, a counter value of a number-of-wins counter Vi (shown simply as "counter" in the drawing) corresponding to the adaptive filter (i) is decremented by one. More specifically, in order to control the reverse copying condition as well by using the same counter as for the forward copying condition, the counter value is set corresponding to the value of the number-of-wins counter Vi. As such, if Vi is a positive value, then (Vi=−1) is set; otherwise, the value of the counter Vi is decremented by one. Then, the process proceeds to step S508.

(Step S505): In the event that the adaptive filter has won, it is determined that the filter coefficient of the adaptive filter is suitable, the number-of-wins counter Vi, which corresponds to the adaptive filter (i), counts up (i.e., the counter value is incremented). More specifically, since the counter value of the number-of-wins counter Vi can be a negative value, if the counter value thereof is a negative value, then (Vi=1) is set; otherwise, the value of the counter Vi is incremented by one.

(Step S506): The value of the number-of-wins counter Vi is compared to a threshold value (threshold value 1) of the number of consecutive wins satisfying the forward copying condition, whereby it is determined whether the adaptive filter (i) satisfies the forward copying condition. If the value of number-of-wins counter Vi has reached the threshold value 1, then it is determined that the forward copying condition is satisfied, and the process proceeds to step S507. Otherwise, if the value of number-of-wins counter Vi does not reach the threshold value 1, then it is determined that the forward copying condition is not satisfied, and the process proceeds to step S508.

(Step S507): If in step S506 it is determined that the forward copying condition is satisfied, the value of i is assigned to j.

(Step S508): The value of i is incremented by one, and the process returns to step S502, whereby to iterate the processing steps for a subsequent adaptive filter.

By execution of the processing procedure, the adaptive filters are sequentially subjected in order of relatively low priority to the comparison with the semi-fixed filter. In the event that the respective adaptive filter has won, the value of the number-of-wins counter is incremented along the positive direction (initiated from one and incremented by one). In the event that the semi-fixed filter has won, the value of the number-of-wins counter is decremented along the negative direction (initiated from −1 and decremented by one). As such, in the case of the positive sign, the value of the counter Vi represents the number of consecutive wins experienced by the adaptive filter (i); and in the case of the negative sign, the absolute value of the counter Vi represents the number of consecutive losses experienced by the filter. When the number of consecutive wins exceeds the threshold value 1, the number i of the adaptive filter (i) is stored to j. The processing steps are sequentially iterated for the respective adaptive filter starting from the adaptive filter (i=1), whereby j is set to the number of highest priority one of the adaptive filters having satisfied the forward copying condition.

(Step S509): Since the comparison of all the adaptive filters has been made, if adaptive filters having satisfied the forward copying condition exist, j is set to the number of highest priority one of the adaptive filters. As such, it is determined whether j is 0. If j is 0, then it is determined that there is no adaptive filter having satisfied the forward copying condition, so that the process terminates.

(Step S510): If j is not 0, the filter coefficient of an adaptive filter (j), which is designated by j, is copied into the semi-fixed filter, thereby to update the filter coefficient thereof. Further, the values of the number-of wins counters V1 to VN corresponding to the respective adaptive filters are set to 0, and the process terminates.

The processing procedure is thus executed, whereby, the filter coefficient of the highest priority one of the adaptive filters having satisfied the forward copying condition is copied into the semi-fixed filter.

A procedure of a reverse copying process procedure to be consecutively executed after the forward copying process is described herebelow.

Figure 7:
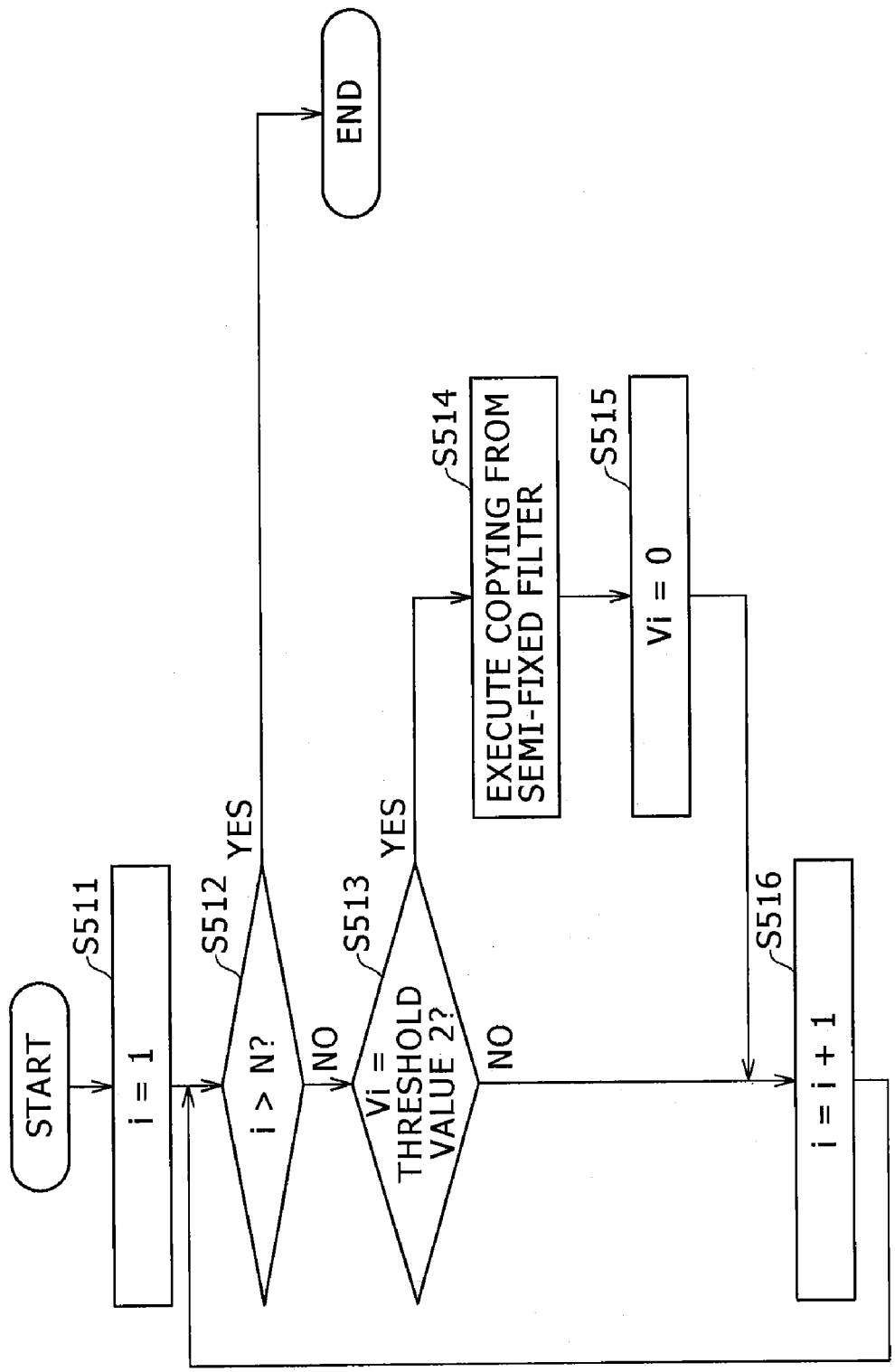
FIG. 7 is a flow diagram showing a procedure of the reverse copying process being executed after completion of the forward copying process in the first exemplary embodiment.

FIG. 7 is the procedure of the reverse copying process being executed after completion of the forward copying process in the first exemplary embodiment of the present invention. It is assumed that the number-of-wins counter Vi is set to a value as a result of the forward copying process shown in FIG. 6.

(Step S511): First, a disposable variable i is initialized to 1. Similarly as in FIG. 6, the variable i designates a target adaptive filter.

(Step S512): The variable i and the total number (N) of adaptive filters are compared with one another. If i is greater than N, it is determined that the process for all the adaptive filters has been completed, and the process terminates. Otherwise, i is N or below, the following processing steps are carried out for the target adaptive filter.

(Step S513): The value of the number-of-wins counter Vi is compared to a threshold value 2 predetermined for the reverse copying condition, whereby it is determined whether the reverse copying condition is satisfied. If the value has reached a number of consecutive losses set with the threshold value 2, then it is determined that the reverse copying condition is satisfied, and the process proceeds to step S514. Otherwise, if the value does not reach the number of consecutive losses, then the process proceeds to step S516.

(Step S514): If the reverse copying condition is satisfied, the filter coefficient of the semi-fixed filter is copied to the filter coefficient of the adaptive filter (i).

(Step S515): The value of the number-of-wins counter Vi is initialized to 0.

(Step S516): The process increments the variable i by 1, and returns to step S512, thereby iterating the processing steps for a subsequent adaptive filter.

By execution of the processing procedure, the filter coefficient of the semi-fixed filter is copied into the adaptive filter having satisfied the reverse copying condition.

The first exemplary embodiment is one example, so that the present disclosure is not limited thereto, an can be applied in various other forms, such as modified embodiments.

For example, the exemplary embodiment has been described with reference to the case where either the forward copying condition for copying from the adaptive filter to the semi-fixed filter or the reverse copying condition for copying from the semi-fixed filter to the adaptive filter is the same for all the adaptive filters. However, the copying condition can be different depending on the respective adaptive filter. One example can be such that, for the adaptive filter 1(33-1), a relatively smaller power value of error is determined to be a respective win for a forward/reverse copying condition, in which 30 consecutive wins satisfy the forward copying condition, and 15 consecutive losses satisfy the reverse copying condition. For the adaptive filter 2(33-2), however, the setting is differentiated such that 60 consecutive wins, which is twice that for the adaptive filter 1(33-1), satisfy the forward copying condition, and 30 consecutive losses, which is also twice that for the adaptive filter 1(33-1).

In addition, in the first exemplary embodiment, all the number-of-wins counters Vi to VN are initialized to 0 after completion of the forward copying process. However, a method can be considered in which such initialization is not carried out for those taking negative values.

Further, in the first exemplary embodiment, while the priority is set to be higher as the step size is larger, the manner of determining the priority is not limited thereto in such a case where, for example, the forward and reverse copying conditions are different depending on the adaptive filter.

Further, the audio process procedure shown in FIG. 5 can be modified as described herebelow.

According to the audio process procedure of FIG. 5, although the echo cancellation process (step S51) for the semi-fixed filter is executed before the forward copying process (step S53) and the reverse copying process (step S54), the echo cancellation process can be executed after the forward and reverse processes. In the modified case, while error in the semi-fixed filter before the copying process has to be preliminarily calculated, an advantage can be obtained in that updating of the coefficient of the semi-fixed filter can be done one term earlier than in the processing procedure of FIG. 5.

Further, in the first exemplary embodiment, while the reverse copying process (step S54) is executed after the execution of the forward copying process (step S53), the execution order can be reversed.

The following describes a procedure in the case of processing execution in order of the reverse copying process and then the forward copying process. In this procedure, the variables i, j, and Vi (in this case also, the initial value of each of the number-of-wins counters V1 to VN is 0) and arrangement order of the adaptive filters are the same as those in FIGS. 6 and 7.

Figure 8:
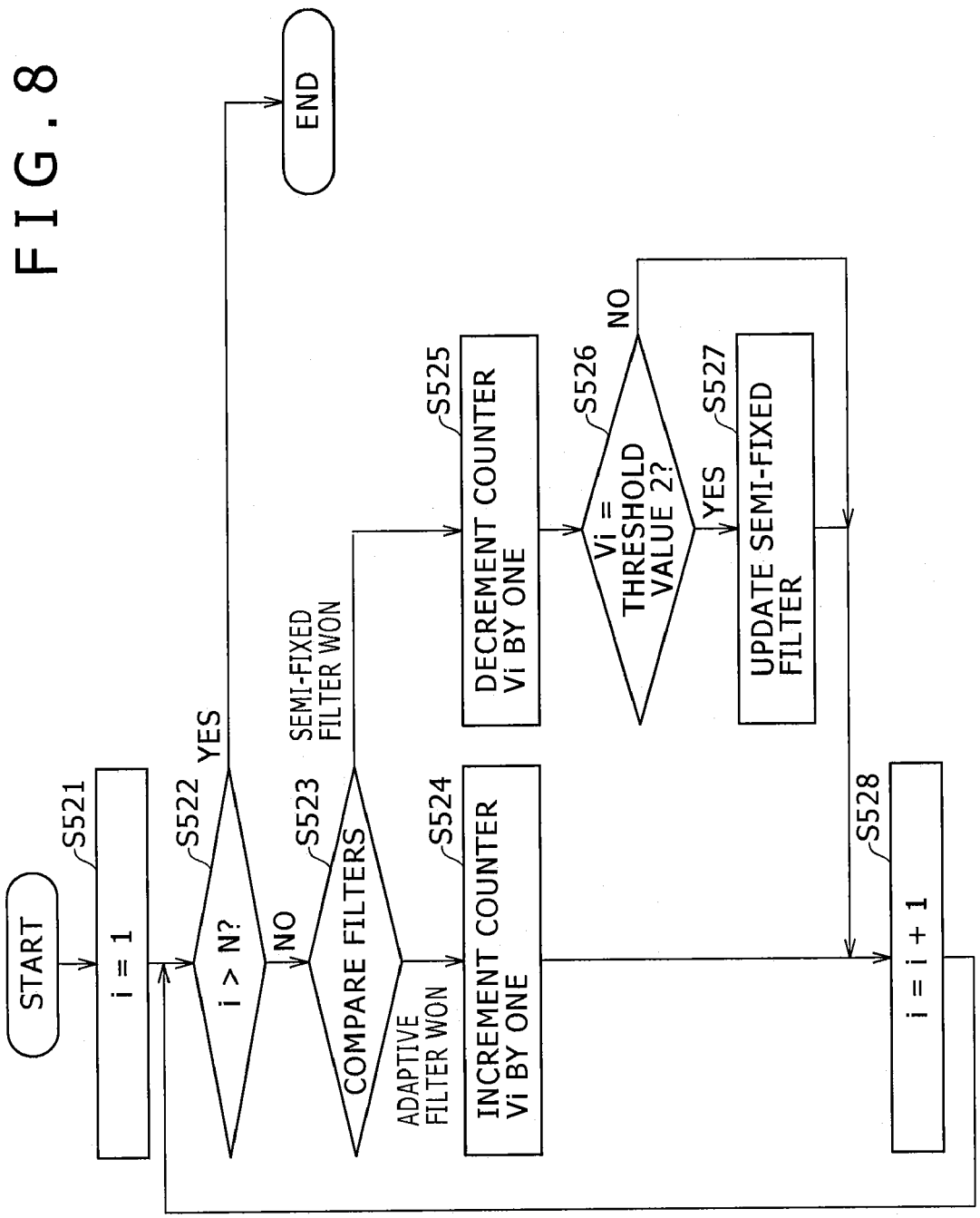
FIG. 8 is a flow diagram showing a procedure of the reverse copying process being executed before the forward copying process in the first exemplary embodiment.

FIG. 8 is a flow diagram showing a procedure of the reverse copying process being executed before the forward copying process in the first exemplary embodiment; (Step S521): A disposable variable i is initialized to 1.

(Step S522): The variable i, which designates a target adaptive filter, and the total number (N) of adaptive filters are compared with one another. If i is greater than N, it is determined that the process for all the adaptive filters has been completed, and the process terminates. Otherwise, i is N or below, the following processing steps are carried out for the target adaptive filter.

(Step S523): The adaptive filter (i) is compared with the semi-fixed filter. Similarly as in FIG. 6, the adaptive filters are compared in the manner that the absolute values of update vectors calculated from the respective filter coefficients are compared with one another, and an adaptive filter with a smaller value is determined to be a won adaptive filter. If the semi-fixed filter wins, then the process proceeds to step S525; otherwise, if the adaptive filter wins, the process proceeds to step S524. In the event of draw, it is determined that the adaptive filter has won.

(Step S524): In the event that the adaptive filter has won, it is determined that the filter coefficient of the adaptive filter is suitable, the number-of-wins counter Vi, which corresponds to the adaptive filter (i), the counter value is incremented. More specifically, since the counter value of the number-of-wins counter Vi can be a negative value, if the counter value thereof is a negative value, then (Vi=1) is set; otherwise, the value of the counter Vi is incremented by one. Then, the process proceeds to step S528.

(Step S525): In the event that the semi-fixed filter has won, then it is determined that the filter coefficient of the semi-fixed filter is suitable, a counter value of a number-of-wins counter Vi corresponding to the adaptive filter (i) is decremented by one. More specifically, in order to control the reverse copying condition as well by using the same counter as for the forward copying condition, the counter value is set corresponding to the value of the number-of-wins counter Vi. As such, if Vi is a positive value, then (Vi=−1) is set; otherwise, the value of the counter Vi is decremented by one.

(Step S526): The value of the number-of-wins counter Vi is compared to the threshold value 2, i.e., the reverse copying condition, whereby it is determined whether the reverse copying condition is satisfied. If the value has reached a number of consecutive losses set with the threshold value 2, then it is determined that the reverse copying condition is satisfied, and the process proceeds to step S527. Otherwise, if the value does not reach the number of consecutive losses, then the process proceeds to step S528.

(Step S527): If the reverse copying condition is satisfied, the filter coefficient of the semi-fixed filter is copied to the filter coefficient of the adaptive filter (i), and the value of the number-of-wins counter Vi is initialized to 0.

(Step S528): The process increments the variable i by 1, and returns to step S522, thereby iterating the processing steps for a subsequent adaptive filter.

Figure 9:
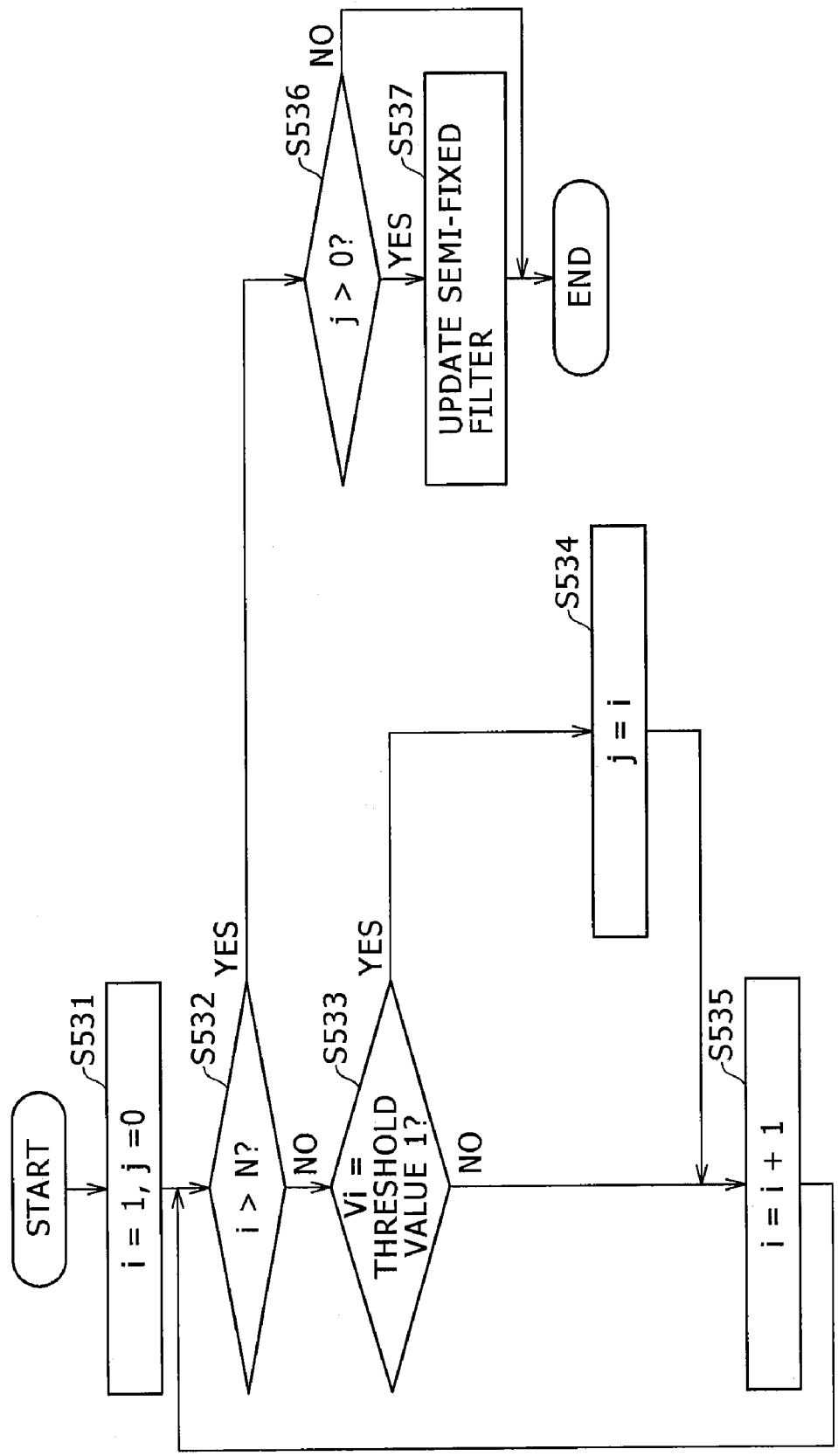
FIG. 9 is a flow diagram showing a procedure of the forward copying process being executed after completion of the reverse copying process in the first exemplary embodiment.

By execution of the processing procedure, the adaptive filters are sequentially subjected in order of relatively low priority to the comparison with the semi-fixed filter. In the event that the respective adaptive filter has won, the value of the number-of-wins counter is incremented along the positive direction (initiated from one and incremented by one). In the event that the semi-fixed filter has won, the value of the number-of-wins counter is decremented along the negative direction (initiated from −1 and decremented by one). As such, in the case of the positive sign, the value of the counter Vi represents the number of consecutive wins experienced by the adaptive filter (i); and in the case of the negative sign, the absolute value of the counter Vi represents the number of consecutive losses experienced by the filter. When the number of consecutive losses reaches the threshold value 2, it is determined that the reverse copying condition is satisfied, and the filter coefficient of the semi-fixed filter is copied to the filter coefficient of the adaptive filter (i). Subsequently to the above, a forward copying process is executed FIG. 9 is a flow diagram showing a procedure of the forward copying process being executed after completion of the reverse copying process in the first exemplary embodiment.

(Step S531): A disposable variable i is initialized to 1, and j is initialized to 0.

(Step S532): The variable i, which designating a target adaptive filter, and the total number (N) of adaptive filters are compared with one another. If i is greater than N, it is determined that the process for all the adaptive filters has been completed, and the process proceeds to step S536. Otherwise, i is N or below, the following processing steps are carried out for the target adaptive filter.

(Step S533): The value of the number-of-wins counter Vi is compared to the threshold value (threshold value 1) of the number of wins satisfying the forward copying condition, whereby it is determined whether the adaptive filter (i) satisfies the forward copying condition. If the value of number-of-wins counter Vi does not reach the threshold value 1, then it is determined that the forward copying condition is not satisfied, and the process proceeds to step S535.

(Step S534): If in step S533 it is determined that the forward copying condition is satisfied, the value of i is assigned to j.

(Step S535): The value of i is incremented by one, and the process returns to step S532, whereby to iterate the processing steps for a subsequent adaptive filter.

(Step S536): Since the comparison of all the adaptive filters has been made, if adaptive filters having satisfied the forward copying condition exist, j is set to the number of highest priority one of the adaptive filters. As such, it is determined whether j is 0. If j is 0, then it is determined that there is no adaptive filter having satisfied the forward copying condition, so that the process terminates.

(Step S537): If j is not 0, the filter coefficient of an adaptive filter (j), which is designated by j, is copied into the semi-fixed filter, thereby to update the filter coefficient thereof. Further, the values of the number-of-wins counters VI to VN corresponding to the respective adaptive filters are set to 0, and the process terminates.

The processing procedure is thus executed, whereby, the filter coefficient of the highest priority one of the adaptive filters having satisfied the forward copying condition is copied into the semi-fixed filter.

A second exemplary embodiment is described below.

Although the configuration in the first exemplary embodiment includes the plurality of adaptive filters in which the amounts of update are different from one another, the configuration in the second exemplary embodiment is formed to include a single adaptive filter 33b (FIG. 10) that enables an arbitrary amount of update to be set.

Other component elements of processing functions included in a signal processor section in the second exemplary embodiment are the same as those in the first exemplary embodiment shown in FIG. 4. As such, functions in the second exemplary embodiment are described using reference characters including those shown in FIG. 4. Further, the overall processing flow in the second exemplary embodiment is substantially the same as that shown in FIG. 5, except that the determination as to forward copying or reverse copying process is made only between the adaptive filter 33b and the semi-fixed filter 34.

Figure 10:
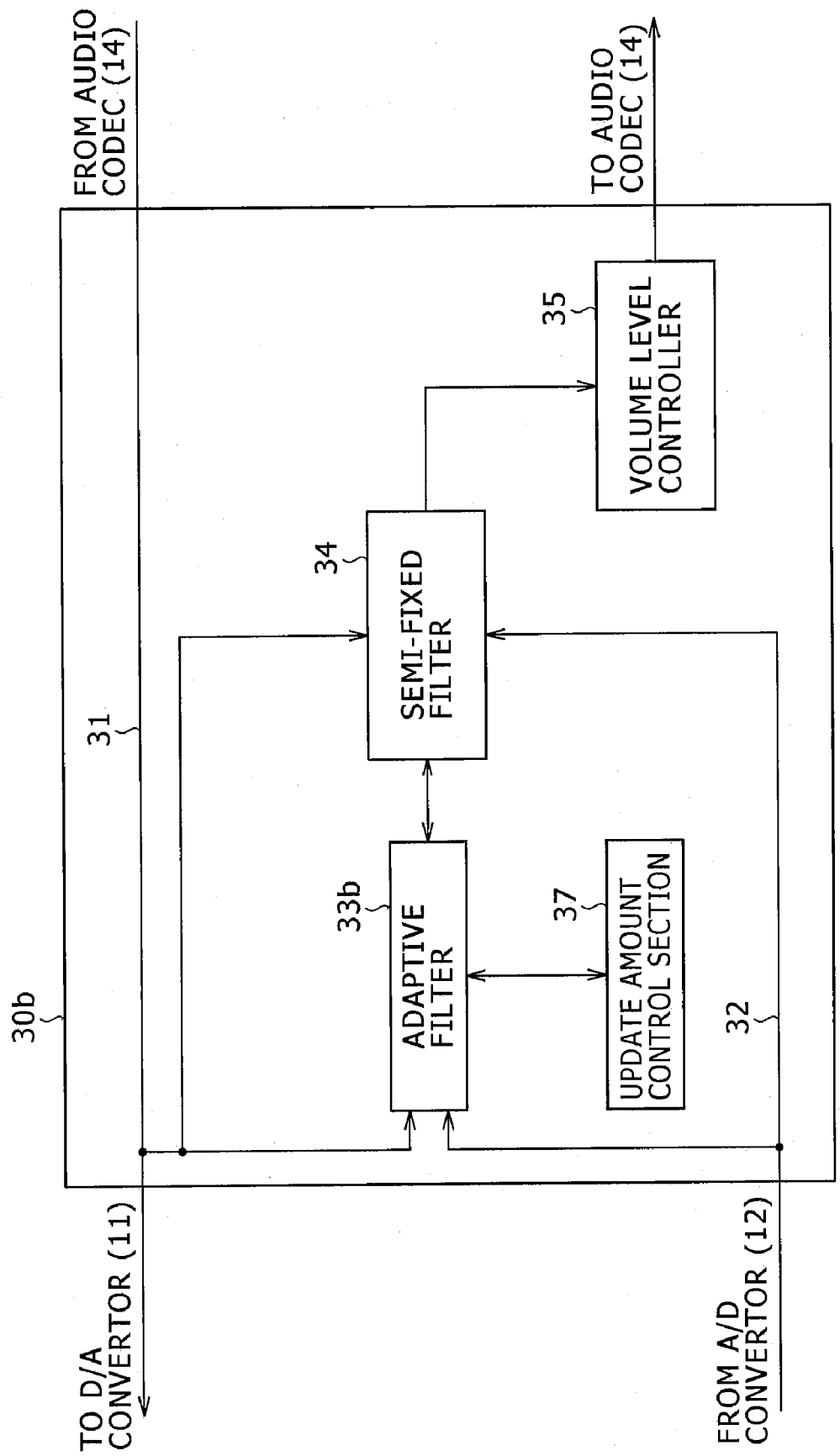
FIG. 10 is a view showing the configuration of a signal processor section of a second exemplary embodiment.

FIG. 10 is a view showing the configuration of the signal processor section, 30b, of the second exemplary embodiment. The signal processor section 30b of the second exemplary embodiment is configured to include only the single adaptive filter 33b (as described above) and an update amount control section 37 that controls the amount of update for the adaptive filter 33b.

As described in the first exemplary embodiment, in the single talk event, as the adaptive filter converges, the length of the respective update vector eventually varies to be smaller; however, in the double talk event, the update vector abruptly takes a large value. As such, the update amount control section 37 sets the amount of update for a respective filter coefficient of the adaptive filter 33b, such as the step size, in correspondence to the length of the update vector. For example, when it is determined corresponding to the update vector that the state is in the double talk state, the filter coefficient is not updated. Specifically, the step size is set to 0. Otherwise, when it is determined that the state is not the double talk state (that is, the state is the single talk state), the step size is returned to the normal value.

Figure 11:
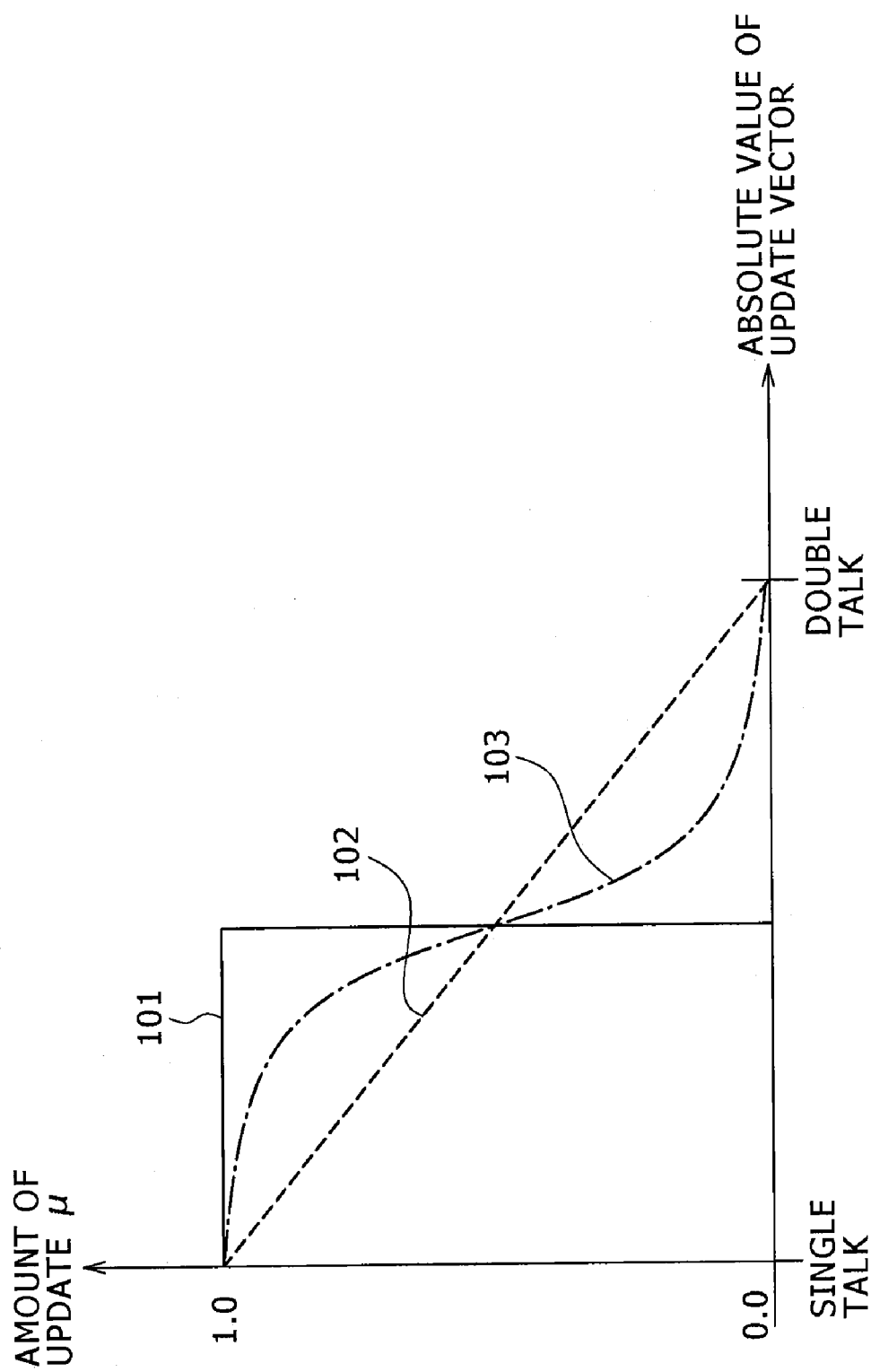
FIG. 11 is a diagram showing exemplary step size setting in the second exemplary embodiment.

FIG. 11 is a view showing exemplary step size setting in the second exemplary embodiment. In the diagram, the horizontal direction (axis) represents the absolute value of the update vector, and the horizontal direction (axis) represents the level of the step size. An example 1(101) indicates that, as described above, the state where the absolute value of the update vector is smaller than or equal to the threshold value is determined to be not the double talk state, and the amount of update (step size μ) is returned to the normal value (=1.0). In a case where the absolute value of the update vector exceeds the threshold value, the case is determined to be the double talk state, and the amount of update (step size μ) is set to 0.

A respective examples 2(102), 3(103) indicates a case where the amount of update (step size p) is sequentially varied corresponding to the length of the update vector. In this case, when the absolute value of the update vector is in the reducing direction, the step size p is increased; and when the absolute value of the update vector is in the increasing direction, the step size p is reduced. A function determining the step size in correspondence to the absolute value of the update vector can be arbitrarily set corresponding to the system.

Thus, in the second exemplary embodiment, effects similar to those of the first exemplary embodiment can be obtained in the manner that the amount of update is varied corresponding to the level of the absolute value of the update vector.

A third exemplary embodiment is described below. In the first, second embodiment, all the frequency bands of the audio signal are batch processed; however, in the third exemplary embodiment, the audio signal is divided into frequency subbands and is processed in units of the divided frequency subband.

Component elements of processing functions included in a signal processor section 30c (FIG. 12) are similar to those of the first exemplary embodiment shown in FIG. 4. As such, functions in the third exemplary embodiment will be described using characters including those shown in FIG. 4.

Figure 12:
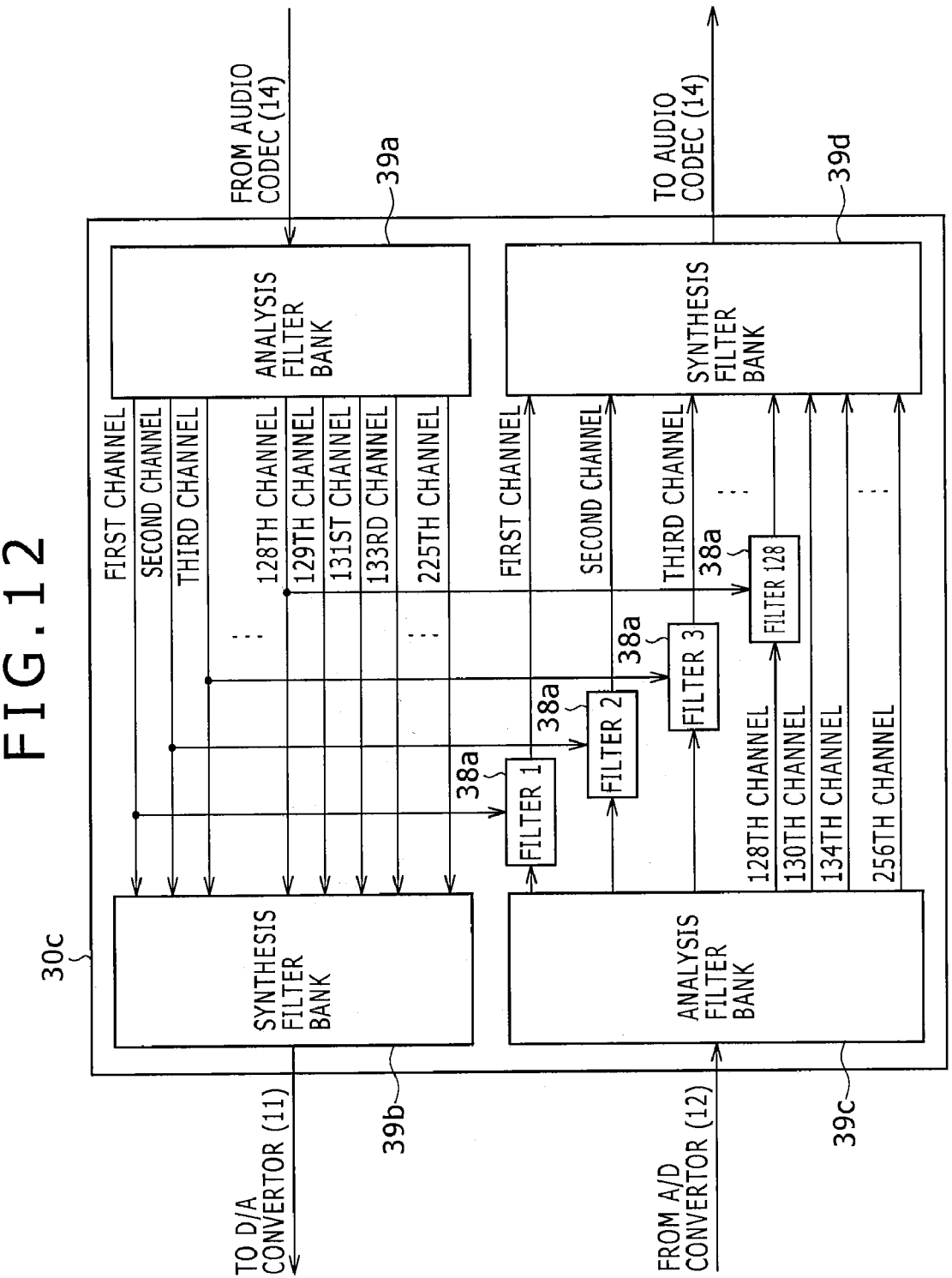
FIG. 12 is a view showing the configuration of a signal processor section of a third exemplary.

FIG. 12 is a view showing the configuration of the signal processor section 30c of the third exemplary embodiment.

The signal processor section 30c of the third exemplary embodiment is configured to include 256 channels for frequency subbands divided by a respective analysis filter bank 39a, 39c. In the configuration, it is assumed such that a first channel outputs a lowest frequency component, the channels are sequentially numbered, and a filter for a highest frequency component is provided to a 256th channel. With the first to 128th channels, filters 1(38a), 2(38b), 3(38c), . . . , 128(38d) are used to perform the audio process; and with the 129th to 256th channels, audio signals only on odd or even numbered channels are transmitted or communicated.

The respective filters 1(38a), 2(38b), 3(38c), . . . , 128(38d) is provided with the configuration of either the signal processor section 30 of the first exemplary embodiment or the signal processor section 30b of the second exemplary embodiment. As such, the process described in the first exemplary embodiment shown in FIG. 4 or the second exemplary embodiment shown in FIG. 10 is executed in units of the audio signal on the subdivided band (subband). The audio process is execution using the filters for the first to 128th channels for the reason that, generally, a large number of audio signals are contained in frequency bands on a low frequency side.

With 129th to 256th channels, a speaker audio process is executed in the manner that, of signal components on the subband channels subband-divided by the analysis filter bank 39a, signal components on even numbered channels are removed, and then the audio signals are supplied to a synthesis filter bank 39b. A microphone audio process signal is executed such that, of signal components on the subband channels subband-divided by the analysis filter bank 39c, signal components on odd numbered channels are removed, and then the audio signals are supplied to a synthesis filter bank 39d.

Thus, in the third exemplary embodiment, adaptive filter assessment corresponding to the length of the update vector and the process of setting optimal filter coefficients into the semi-fixed filter are performed in units of the divided subband audio signal, whereby effects similar to those of the respective first, second embodiment can be obtained.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An audio processor of a loud speech communication system including a speaker and a microphone, the audio processor comprising:
   an adaptive filter wherein an amount of update in a learning event is set to an arbitrary value, and a filter coefficient is serially determined corresponding to the set amount of update;
   a semi-fixed filter adapted to an echo cancellation process of an audio input signal input from the microphone;
   adaptive filter assessment means that calculates a length of an update vector based on the filter coefficient determined by the adaptive filter and a length of an update vector based on a filter coefficient set in the semi-fixed filter and that performs assessment of the filter coefficients by comparing the lengths of the update vectors; and
   coefficient specifying means that sets an optimal filter coefficient, from among the filter coefficients assessed by the adaptive filter assessment means, into the semi-fixed filter in according to a result of the assessment of the filter coefficients performed by the adaptive filter assessment means.

2. An audio processor according to claim 1, wherein
   a plurality of the adaptive filters are provided, and the amount of update is set to a different value and the filter coefficient is serially determined corresponding to the amount of update in each of the plurality of the adaptive filters;
   the adaptive filter assessment means performs calculation and assessment of a length of an update vector based on a filter coefficient set in each of the plurality of the adaptive filters; and
   the coefficient specifying means retrieves a filter coefficient satisfying a predetermined criterion from the filter coefficients of the adaptive filters in accordance with the result of the assessment, selects the retrieved filter coefficient of the adaptive filter satisfying the predetermined criterion, and sets the selected filter coefficient into the semi-fixed filter.

3. An audio processor according to claim 2, when plural filter coefficients among the filter coefficients satisfies the predetermined criterion in accordance with the result of the assessment, the coefficient specifying means sets a filter coefficient of an adaptive filter among the plural adaptive filters into the semi-fixed filter in accordance with a predetermined priority.

4. An audio processor according to claim 1, wherein
   the adaptive filter is a single adaptive filter enabling the amount of update to be arbitrarily set; and
   the coefficient specifying means determines whether or not to update a filter coefficient of the single adaptive filter in accordance with a comparison result.

5. An audio processor according to claim 1, wherein
the adaptive filter is a single adaptive filter enabling the amount of update to be arbitrarily set; and
the coefficient specifying means calculates an amount of update for the single adaptive filter and sets the calculated amount of update into the adaptive filter in accordance with a comparison result.

6. An audio processor according to claim 1, further comprising volume level control means that controls a volume level of an audio input signal from which echo has been cancelled by using the semi-fixed filter corresponding to a length of an update vector based on a filter coefficient of a highest assessment adaptive filter among the adaptive filters.

7. An audio processor according to claim 6, wherein the volume level control means mutes the residual echo component when the length of the update vector is smaller than or equal to a predetermined reference value.

8. An audio processor according to claim 6, wherein the volume level control means determines a value of the volume level corresponding to the length of the update vector.

9. An audio processor according to claim 1, further comprising:
output audio signal dividing means that subband-divides an output audio signal output from the speaker into a plurality of frequency bands;
output signal synthesizing means that synthesizes the output signals subband-divided into the frequency bands; and
reception audio signal dividing means that synthesizes reception audio signals subband-divided into the frequency bands,
wherein the adaptive filter, the semi-fixed filter, the adaptive filter assessment means, and the coefficient specifying means are provided in units of a partial frequency band range of the frequency band.

10. An audio processor according to claim 1, wherein the filter coefficient of the adaptive filter is serially updated, and the filter coefficient of the semi-fixed filter is fixed to a set value except when updated by the coefficient specifying means.

* * * * *